United States Patent [19]
Müller

[11] 3,926,442
[45] Dec. 16, 1975

[54] SLIDING RING SEAL
[75] Inventor: Heinz Konrad Müller, Stuttgart, Germany
[73] Assignee: Sealol, Inc., Warwick, R.I.
[22] Filed: Oct. 16, 1973
[21] Appl. No.: 406,880

[30] Foreign Application Priority Data
Oct. 28, 1972 Germany............................ 2253512

[52] U.S. Cl. ...................... 277/3; 277/27; 277/74; 277/75; 277/91
[51] Int. Cl.² ........................................ F16J 15/34
[58] Field of Search ............ 277/91, 74, 75, 73, 27, 277/3

[56] References Cited
UNITED STATES PATENTS
3,099,453   7/1963   Dunn et al. ............................ 277/27
3,410,565   11/1968  Williams ........................... 277/27 X
3,506,276   4/1970   Petersen et al. ...................... 277/91

Primary Examiner—Samuel B. Rothberg
Attorney, Agent, or Firm—William Frederick Werner

[57] ABSTRACT

This specification discloses a sliding ring seal of the type in which a flow of pressurized buffer fluid opposes or counteracts the pressure of the fluid being sealed and is an improvement in the invention described and claimed in U.S. Pat. Nos. 3,556,538 granted Jan. 19, 1971 and 3,659,860 granted May 2, 1972.

7 Claims, 10 Drawing Figures

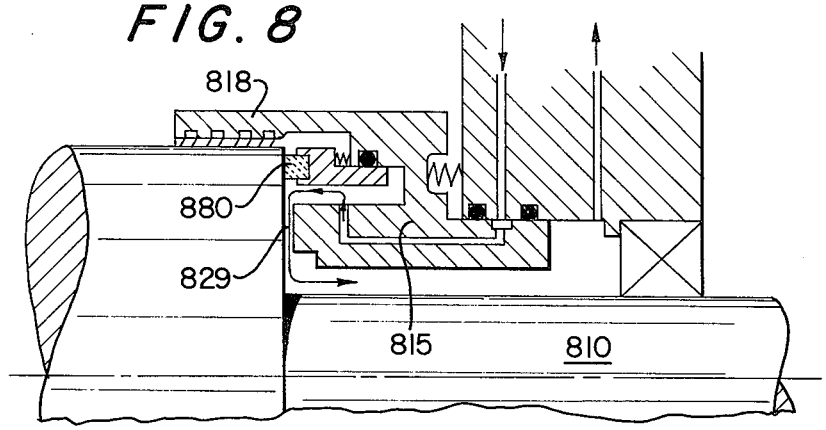
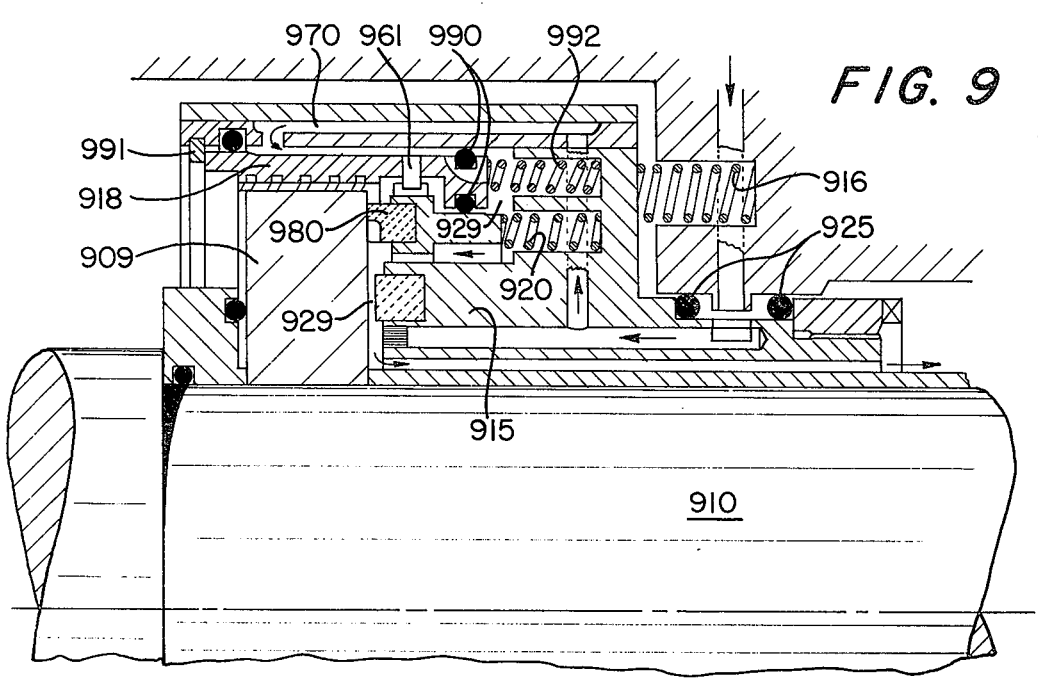

SLIDING RING SEAL

This invention relates to sealing devices commonly employed in conjunction with a rotary shaft to provide for the sealing of a fluid under high pressure differentials. The invention is concerned with a seal of the type in which a flow of pressurized buffer fluid opposes or counteracts the pressure of the fluid being sealed.

Difficulties arise in providing effective sealing where the seal is subjected to high pressure differentials and the relatively rotating components have high speed differentials, for example in chemical plant, nuclear reactors, and submarines operating at extreme depths. In these applications pressure differentials of up to three hundred atmospheres and shaft speeds of over 100 m/sec. can occur.

U.S. Pat. Nos. 3,556,538 and 3,659,860 describe a seal utilizing a buffer-fluid pressure control ring (hereinafter referred to as a "B.C.R.") wherein the buffer fluid is fed into a chamber defined by a static seal and a primary dynamic seal. The buffer fluid leaves the chamber through a space with reduced dimensions, for example formed by a radial annular gap between an end face of the B.C.R. which rotates with the shaft, and a part of a static housing of the shaft. This annular gap or control clearance acts as a throttle and an equilibrium is formed between the pressure of the pressure fluid and that of the buffer fluid acting in opposite directions on the B.C.R. The action of the seal also influenced by the design of the B.C.R. e.g. the surface areas and dimensions which are acted on by the fluid pressures.

The B.C.R. used in the constructions described in our said Patent rotate with the shaft and are able to move axially and have a small degree of radial movement relative thereto. Disadvantages arise due to the rotation of the B.C.R. with the shaft particularly at high overload and distortions as well as oscillation and vibration, as the radial play necessarily allowed causes uncontrolled wobbling movements of the B.C.R. so that the throttle gap is varied and the effective sealing at sliding interfaces is prevented. Moreover elastomeric seals between the shaft and the B.C.R. rotating therewith cannot easily be cooled directly by the buffer fluid and this is a particular disadvantage where the pressure fluid is heated.

The object of the present invention is to provide an improved form of sealing device which remains effective under extreme working conditions.

According to the invention a sealing assembly for sealing an operatively rotating shaft within a fixed housing against pressure fluid loss includes a buffer-fluid pressure control ring, characterized in that said ring is axially movable but restrained against rotation relative to the housing and defines, in conjunction with a radial face of the shaft, a control clearance through which pressurized buffer fluid is operatively fed in opposition to the pressure of pressure fluid acting axially on the ring whereby the pressure of the buffer fluid is automatically regulated in direct proportion to the pressure of the pressure fluid by variation in the effective width of the control clearance.

Preferred embodiments of the invention and certain modifications thereof are now more particularly described with reference to the accompanying drawings wherein:

FIG. 8 is a like sectional view of an eighth form of shaft sealing assembly.

FIG. 9 is a like sectional view of a ninth form of shaft sealing assembly and

Figure 1:
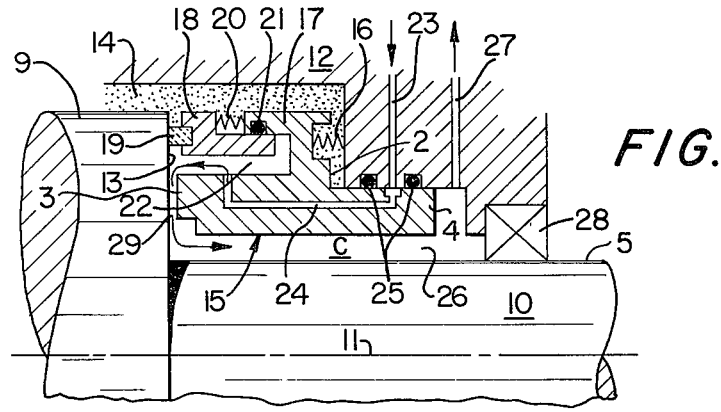
FIG. 1 is a sectional view of a shaft sealing assembly, the section being in a radial plane of the shaft.

In FIG. 1 a shaft 10, operatively rotating about axis 11 within a fixed housing 12, has an increased diameter portion 9 having a radial face 13. Said portion may be integral with the shaft or may be a collar attached thereto.

Pressure fluid to be sealed extends operatively past portion 9 into a radially outer pressure fluid space 14 of housing 12 at pressure P1, and a B.C.R. 15 seen in radial section in the drawing is located in surrounding relationship to the lesser diameter 5 part of shaft 10 in close axial proximity to face 13 but not overlying portion 9 of the shaft, and is urged axially towards said face by springs 16 acting on a radially outwardly extended rear surface 2 of flange 17 of the ring body 15.

An annular primary face seal 18 in telescopic sliding engagement with flange 17 carries a sealing element or face 19 urged radially into abutment with face 13 by springs 20, a secondary "O-ring" seal 21 sealing the sliding interface between seal 18 and the flange 17.

Pressurized buffer fluid is operatively admitted to a space 22 defined in part by seal 18 and a radially outer part of face 13 by way of a duct 23 in housing 12 which opens into an internal passage 24 within B.C.R. 15, a telescopic junction between a tail portion 4 of the latter and the housing being sealed by a pair of O-rings or other elastomeric elements 25.

A radially innermost and wider passage 26 defined between shaft 10 and the ring body 15 leads away from face 13 to communicate directly with an outlet duct 27 in housing 12, the end of said passage remote from face 13 being sealed by an element 28 located in the housing in direct abutment with the shaft.

In operation pressurized buffer fluid is pumped into space 22 to act in opposition to the pressure of the pressure fluid acting axially on flange 17 to drive B.C.R. 15 towards face 13.

The buffer fluid will attain a pressure P3 in space 22 which will be automatically regulated by escape therefrom through a control clearance 29 between face 13 and the radial end face of ring 15 to achieve an axial balance of forces on B.C.R. 15, P3 being proportional to P1 and when the areas of ring 15 on which the pressure fluid acts are correctly proportioned relative to the areas on which the buffer fluid acts the two pressures P1 and P3 will be substantially equal. Buffer fluid passing through clearance 29 into passage 26 is reduced to a low back pressure P2, usually almost atmospheric pressure.

Figure 2:
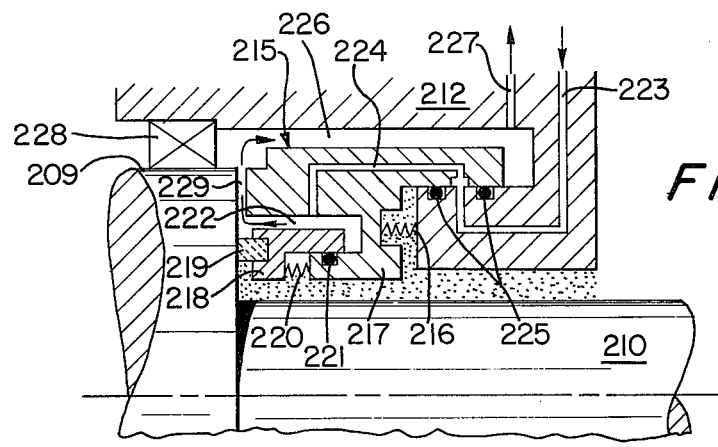
FIG. 2 is a like sectional view of another form of shaft sealing assembly.

FIG. 2 shows a modified arrangement of FIG. 1 in which the pressure fluid to be sealed acts on the inner diameter of the B.C.R. and the buffer fluid is fed radially outwardly through the control clearance. In other respects the function is the same and the equivalent parts have been given the same reference numerals prefixed by "2".

Figure 3:
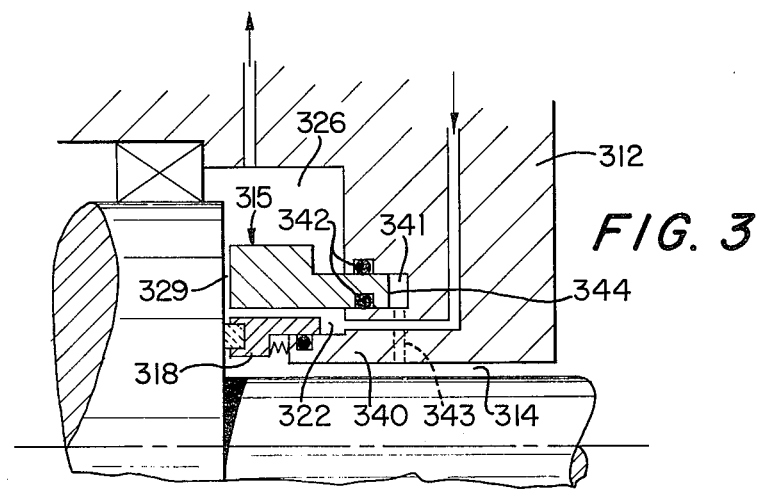
FIG. 3 is a like sectional view of a third form of shaft sealing assembly.

FIG. 3 shows a particularly convenient and effective form of the invention, arranged similarly to FIG. 2 but with a primary face seal 318 carried on a part 340 of the housing 312, not on the B.C.R. 315. Here a tail portion of B.C.R. 315 locates in an annular groove 341 of the housing sealed by a pair of elastomeric elements 342, and a duct 343 leads pressure fluid from space 314 to act on rear face 344 of ring 315 at pressure P1. The area of face 344 acted on at this pressure is balanced against the area of the control clearance 329 by which buffer fluid at pressure P3 escapes from space 322 into passage 326.

Figure 4:
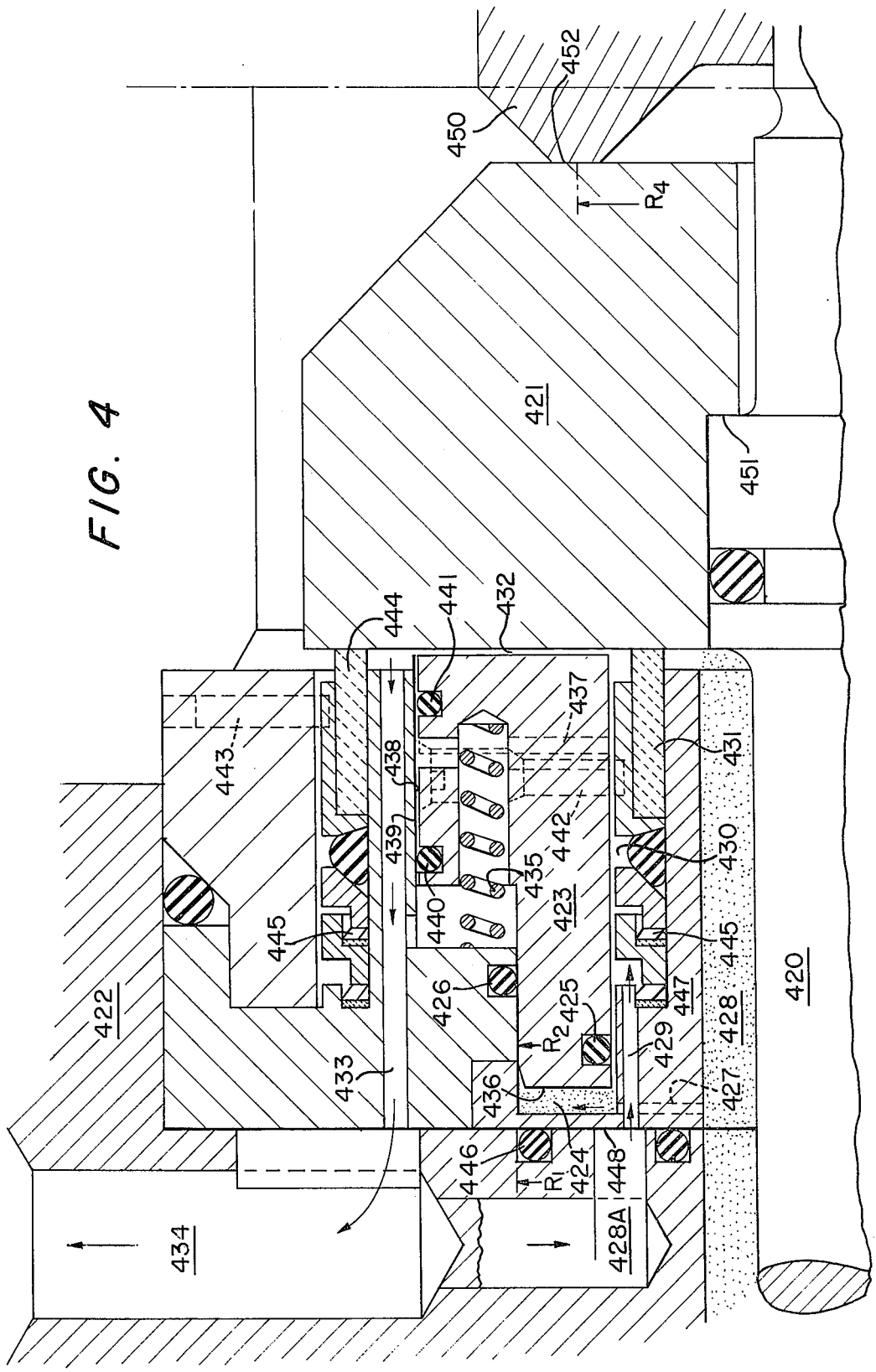
FIG. 4 is a detailed radial section of a fourth form of shaft sealing assembly.

FIG. 4 shows on a larger scale a detailed radial section of a sealing assembly operating on the same principles as FIG. 3 for sealing a rotating shaft 420 and associated rotating collar 421 within a fixed supporting housing 422, the assembly including a generally L section B.C.R. 423. A chamber 424 is defined by the B.C.R. in conjunction with a pair of O-rings 425, 426 and the pressure fluid to be sealed is admitted under pressure P1 through bore 427 from the area 428 immediately surrounding shaft 420 into said chamber. Buffer fluid passes through an annular channel 428 A and bores 429 into a space 430 between a primary slide ring 431 and B.C.R. 423. The buffer fluid also passes between the B.C.R. and rotating collar 421 forcing them apart to form a control clearance 432 whose width depends on the flow of buffer fluid per unit time, the buffer fluid leaving the assembly by way of passages 433 and 434. Springs 435 act on the B.C.R. 423 to urge it axially towards the co-acting radial and face of rotating collar 421 so that clearance 432 is non-existant at zero flow of buffer fluid, and to control pressure differential P1-P3 while said fluid is flowing.

Independently of the flow rate of the buffer fluid the pressure P3 arises in the annular space between slide ring 431 and the entrance to clearance 432 dependent on the pressure P1 of pressure fluid and the force of the springs 435 acting on B.C.R. 423. The pressure fall profile in clearance 432 from P3 to P2 has to maintain equilibrium between the force on the B.C.R. in the clearance and the thrust of the pressure being sealed acting upon area 436 of the B.C.R. in chamber 424 together with the force of said springs.

If the sealing pressure P1 drops abruptly, the buffer fluid pressure acts to immediately increase the width of clearance 432, in turn causing a drop in the buffer fluid pressure P3 so that a balance of forces is again achieved acting on B.C.R. 423. This automatic control ensures that the primary slide ring 431 is subjected to equal radial pressures from both sides independently of the value of P1.

Pressurized buffer fluid at pressure P3 passes through a bore 437 to enter a radially outer narrow gap 430 between the B.C.R. and a wall 439 of housing 422 bounded by a pair of O-rings 440, 441, to counteract deformation of B.C.R. 423 by pressure P3 in space 430.

Pins 442 and 443 engage slots in respective sealing rings of primary slide ring 431 and a secondary slide ring 444 to prevent them being entrained by the rotating collar 421. The sliding rings are urged axially against the radial face of collar 421 by spring rings 445.

Further elastomeric seals and O-rings seal the various interfaces between the components of the assembly.

The flow of buffer fluid passes at high speed around all the parts of the sealing assembly such as the O-rings and sliding ring seals which would be affected by excessive heat e.g. due to friction and heat conducted from the pressure fluid, so as to cool them. An O-ring 446 is positioned so that its outer radius R1 is slightly less than inner radius R2 of ring 426 so that the pressure force of P1 on housing ring 447 slightly exceeds the force P3 acting on radial face 448 of said ring and the latter is thus urged firmly against the housing itself.

A buttress ring 450 fixes collar 421 against a shoulder 451 of shaft 420 and is provided with an annular edge 452 at radius R4 for counteracting movements of force acting on collar 421 through the action of the sealing assembly and fluid pressures associated therewith.

Figure 5:
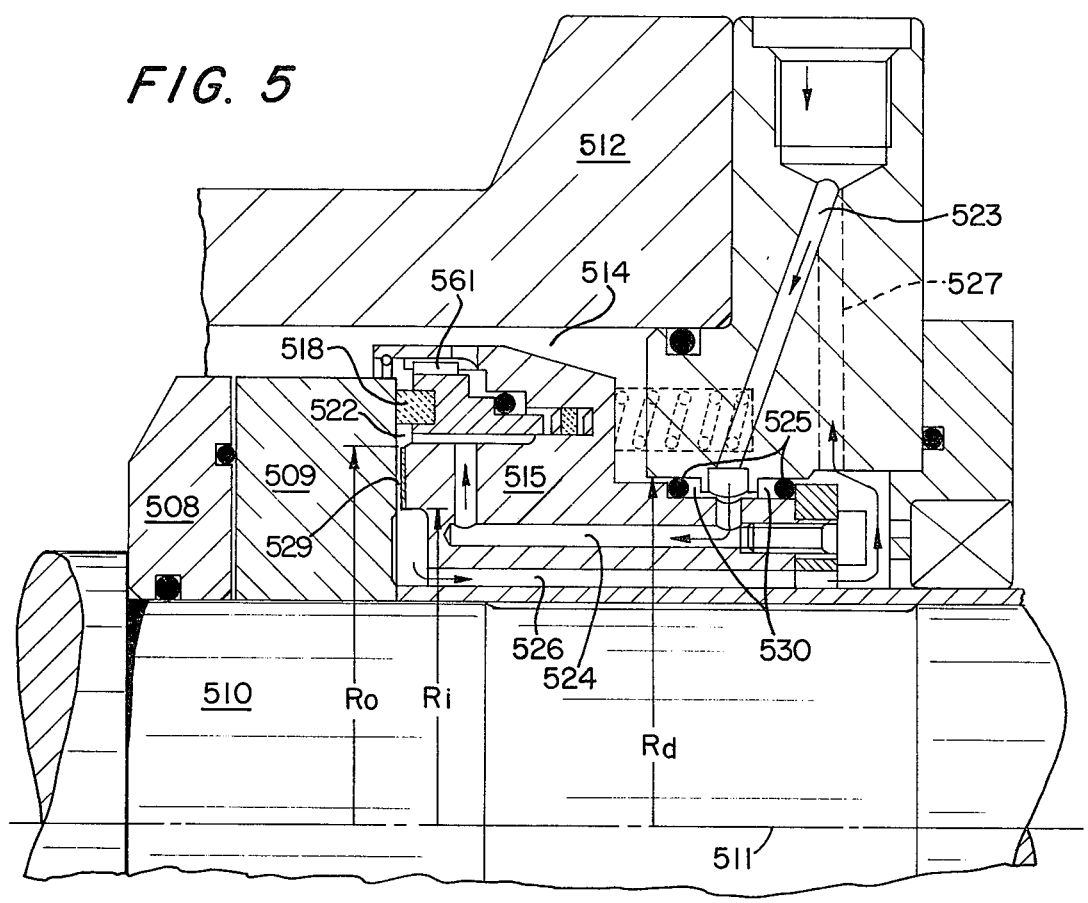
FIG. 5 is a like section of a fifth form of shaft sealing assembly.

FIG. 5 shows a sealing assembly functionally under normal operating conditions in the same manner as the assembly described with reference to FIG. 1, but including provision for the non-rotating B.C.R. 515 to act as a contact seal in the event of loss of the buffer fluid pressure e.g. due to pump failure.

Shaft 510 rotating about axis 511 within fixed housing 512 carries with it collar 509 backed up by a buttress ring 508. B.C.R. 515 mounts annular primary face seal 518 in an annular groove, said seal being restrained against rotation by interengaging formations 561 permitting relative axial displacement of the B.C.R. and seal.

Buffer fluid reaches space 522 by way of duct 523 in the housing and internal passage 524 within B.C.R. 515, the telescopic junction between a tail portion of the B.C.R. and the housing being sealed by a pair of O-rings 525 referred to hereafter. From space 522 said fluid passes through control clearance 529 into passage 526 leading to outlet duct 527.

The end of ring 515 defining clearance 529 is formed of carbon and will act as a contact seal if buffer fluid pressure fails permitting B.C.R. 515 to move axially into contact with collar 509 under the pressure of the pressure fluid in outer space 514.

O-rings 525 are located in "forward-backward" recesses 530, i.e. recesses whose axial length is greater than that of the respective ring and having one end defined by a radial face of the B.C.R. 515 and the other end defined by a radial face of the housing 512. This arrangement, which is known in the general sealing art, is here used to ensure that sufficient closing force is exerted on the B.C.R. to seal the control clearance on failure of buffer fluid pressure.

Under normal operating conditions the radial area A of the control clearance $(A - \pi (Ro^2 - Ri^2))$ on which buffer fluid acts will be set against the pressure of the pressure fluid acting on effective area Ah $(Ah - \pi (Ro^2 - Rd^2))$ being the active sealing radius of O-ring 525 as it is thrust axially outwards to abut the radial end face of recess 530 which is part of B.C.R. 515 so that the ring is effectively fast with the B.C.R. by reason of the pressure differential F3-F1 i.e. Rd is the outer radius of O-ring 525.

If there is no buffer fluid pressure, the pressure of pressure fluid P1 urges the ring back to abut the other radial face of recess 530 which is part of housing 512, thus the active sealing radius is reduced and effective area Ah is increased so that the pressure on B.C.R. 515 urging it towards collar 509 is increased.

The mating of B.C.R. 515 against collar 509 on said failure seals pressure fluid which may pass the primary seal 518 because of lack of pressure in space 522.

Figure 6:
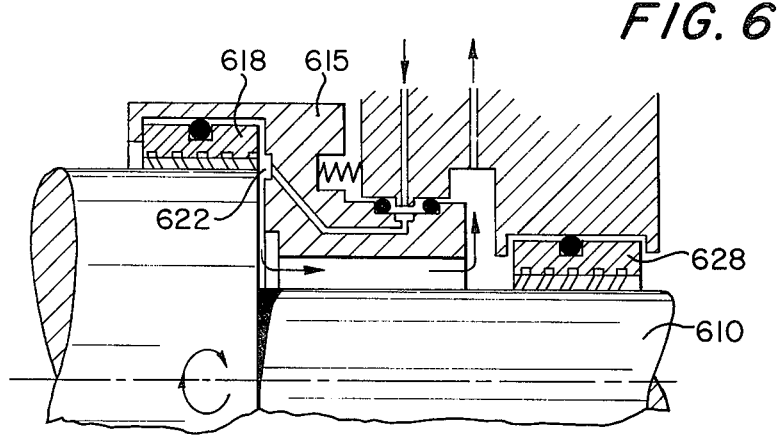
FIG. 6 is a like sectional view of a sixth form of shaft sealing assembly.

FIG. 6 is a sealing assembly for use where the pressure fluid is a gas, the primary seal 618 which separates the pressure and buffer fluid being of the hydrodynamic type known in the sealing art as a "viscosity-screw seal" or "visco-seal" having internal spiral grooves and located in an axially extended end formation of B.C.R. 615 to act on the outer periphery of an enlarged part of the shaft 610. By virtue of the windback action of the seal on relative rotation of the shaft, buffer liquid reaching one end of the grooves from space 622 forms an interface with the pressure gas at an axial position along the visco-seal clearance dependent on the speed of rotation and pressure differential P3-P1. As the action of the B.C.R. has the effect of keeping this differential small, as referred to above, a visco-seal with a short axial length can be employed. The secondary seal 628 is here also a visco-seal.

Figure 7:
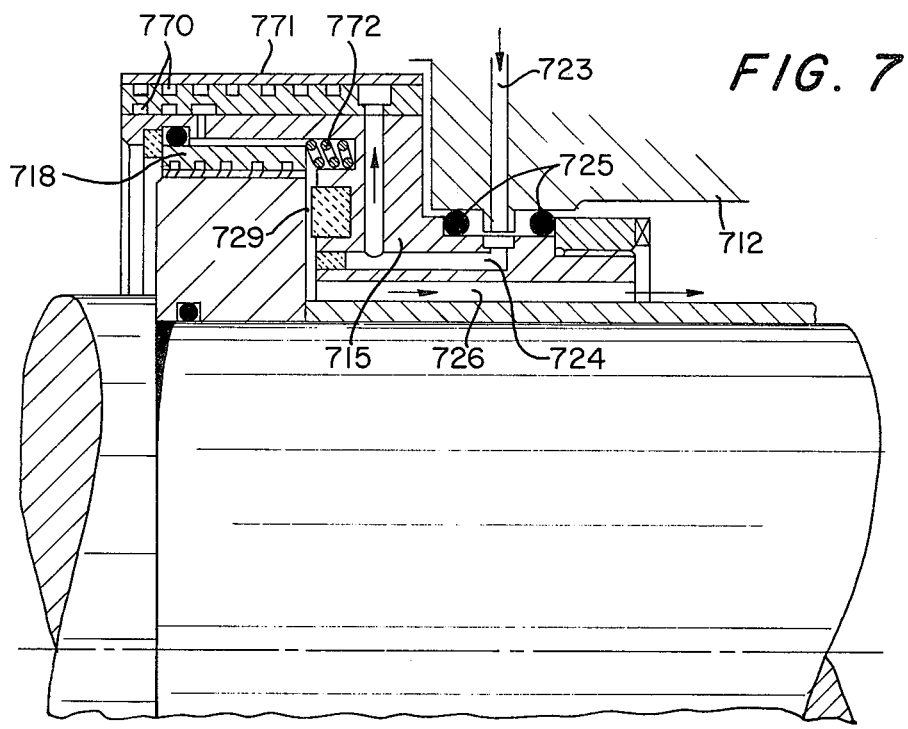
FIG. 7 is a like sectional view of a seventh form of shaft sealing assembly.

In FIG. 7 provision is made for the more effective cooling of primary visco-seal 718 by circulation of buffer fluid there-around. Buffer fluid is fed from housing 712 by way of inlet 723 to duct 724 within the B.C.R. 715 where it is first led through stationary spiral cooling channels 770 axially outwards to the extremity of a cooling jacket 771 on the periphery of the B.C.R. and in surrounding relationship to seal 718 before reaching space 722 feeding both the visco-seal spiral and the control clearance 729 of the B.C.R. Fluid passes from the latter through exit duct 726.

O-rings 725 are located in "forward-backward" recesses to act as described with reference to FIG. 5.

Primary seal 718 is allowed to float axially and radially to a limited extent to accommodate shaft eccentricities.

FIG. 8 shows a hybrid seal assembly, again for use with gas as the pressure fluid. A B.C.R. 815 acts as previously described and mounts a primary visco-seal 818 interacting with the periphery of an enlarged diameter portion of shaft 810. Between seal 818 and the control clearance 829 of B.C.R. a hydrodynamic face seal 880 is located in a recess of the B.C.R. to coact with the end face of the shaft enlargement. In the drawing this is shown in a low speed condition at which it contacts said face but, as known in the sealing art, at higher speeds of rotation it is moved out of actual face contact to reduce wear and friction. In this condition leakage of buffer fluid past seal 880 is retained by visco-seal 818.

This sealing assembly runs contact free and hence wear-free at high speeds but closes leak-tight at low speeds or standstill.

FIG. 9 shows a similar arrangement to FIG. 8 in greater detail. B.C.R. 915 co-acting with collar 909 on shaft 910 to define a control clearance 929, is adapted to act as a contact seal in the event of failure of buffer fluid pressure, O-rings 925 being located in forward-backward recesses as described with reference to FIG. 5.

A primary visco-seal 918 is floatingly located within an outer extension of B.C.R. by O-rings 990 which serve only a locating and not a sealing function, and is axially positioned by being urged into abutment with an end ring 991 by springs 992. Within the structure of seal 918, so as to act between that and clearance 929, is a hydrodynamic face seal 980 urged axially towards the said face of collar 909 by springs 920. Spring 916 assists in closing the clearance 929 at zero speed and flow.

A peg 961 prevents rotation of seals 918 and 980 relative to non-rotating B.C.R. 915.

Buffer fluid is fed to space 929 by way of ducts within B.C.R. 915 including cooling passages 970 (in this case nonspiral) in the outer extension of said ring.

Figure 10:
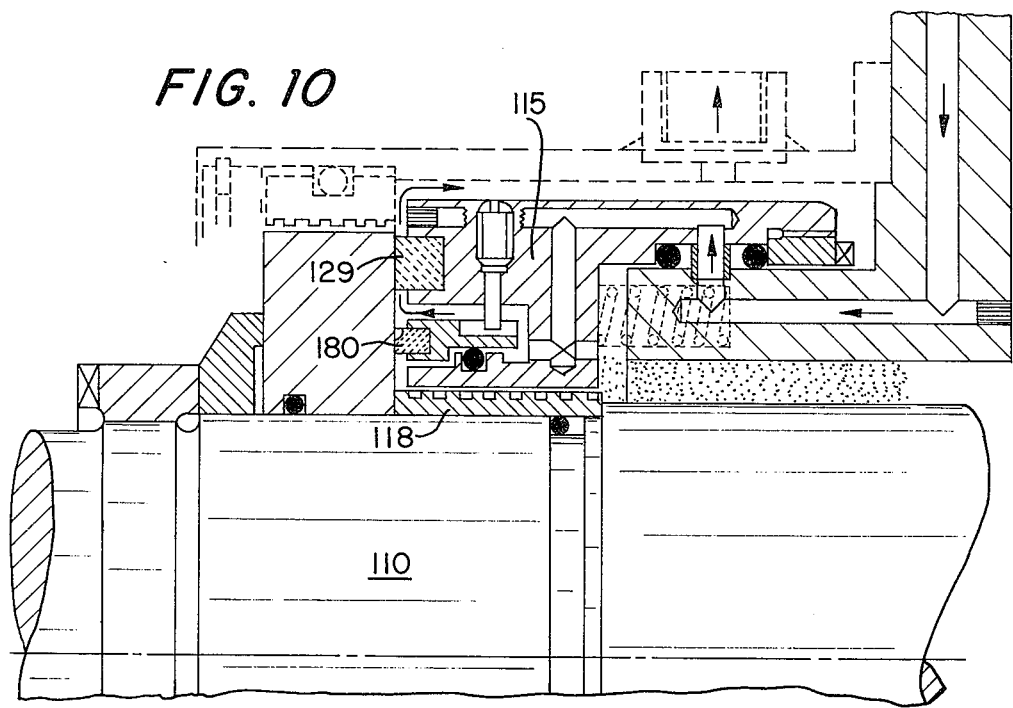
FIG. 10 is a like sectional view of a tenth form of shaft sealing assembly.

FIG. 10 is the "reversed construction" of FIG. 9; that is the lesser diameter part of shaft 110 is subjected to the pressure fluid to be sealed as described with reference to FIG. 2, thus the primary visco-seal 118 acts on the inner diameter of B.C.R. 115; buffer fluid is fed radially outwards through control clearance 129; and hydrodynamic seal 180 is located therebetween. Otherwise the construction and manner of functioning are as described with reference to FIGS. 7–9.

Having shown and described preferred embodiments of the present invention, by way of example, it should be realized that structural changes could be made and other examples given without departing from either the spirit or scope of this invention.

What I claim is:

1. A sliding ring seal for sealing an operatively rotating shaft within a fixed housing against pressure fluid loss, said rotating shaft having an increased diameter portion, provided with a radial face, and a lesser diameter, said housing having a chamber an inlet duct and an outlet duct connecting said chamber with the outside of said housing, said shaft rotatably mounted in said housing, a buffer-fluid pressure control ring, located in said chamber and around said lesser diameter, having a body provided with a radially outwardly extending flange, having a rear surface and a tail portion, said flange forming a pressurized fluid space within said body, and an internal passage in said body connecting said inlet duct with said pressurized fluid space, and a radial end face opposite said radial face providing a control clearance therebetween, fluid sealing means between said tail portion and said housing on opposite sides of said inlet duct connected with said internal passage, an annular primary face seal in telescopic sliding engagement with said flange having a sealing face, a resilient means urging said sealing face into fluid tight relationship with said radial face, a secondary fluid tight seal between said flange and said annular primary face seal, said annular primary face seal and said buffer-fluid pressure control ring dividing said chamber into a pressure fluid space and a pressurized fluid space, whereby, pressurized fluid passing through said inlet duct and internal passage to said pressurized fluid space, flows through said control clearance to and through said outlet duct, pressurized fluid being operatively fed to said control clearance at a constant flow rate in opposition to the pressure of the pressure fluid acting axially on said buffer-fluid pressure control ring whereby the pressure of the buffer-fluid pressure control ring is regulated in direct proportion to the pressure on the pressure fluid by variation in the effective width of the control clearance.

2. An assembly according to claim 1 wherein a second resilient means is positioned between said rear surface and said housing urging said radial end face toward said radial face to axially load said primary face seal to provide fluid sealing between said radial end face and said radial face in the event of failure of the pressurized fluid.

3. An assembly according to claim 2 wherein said primary face seal is a hydrodynamic seal adapted to abut said face at low rotational speeds of the shaft but be spaced therefrom at higher speeds.

4. An assembly according to claim 3, including a primary hydrodynamic viscosity screw seal acting between the control clearance and the part of the shaft operatively subjected to pressure gas.

5. An assembly according to claim 4 wherein the screw seal is floatingly located on said pressure control ring.

6. An assembly according to claim 5 wherein the control ring includes a part in surrounding relationship to the primary seal and defining cooling channels through which buffer fluid is operatively circulated.

7. An assembly according to claim 6 wherein said channels are spiral.

* * * * *